US012786619B2

(12) United States Patent
Roberts

(10) Patent No.: US 12,786,619 B2
(45) Date of Patent: Nov. 3, 2026

(54) EAR INSERT

(71) Applicant: FLARE AUDIO TECHNOLOGIES LIMITED, Lancing (GB)

(72) Inventor: Davies Roberts, Sussex (GB)

(73) Assignee: FLARE AUDIO TECHNOLOGIES LIMITED, Lancing (GB)

( * ) Notice: Subject to any disclaimer, the term of this patent is extended or adjusted under 35 U.S.C. 154(b) by 219 days.

(21) Appl. No.: 18/616,713

(22) Filed: Mar. 26, 2024

(65) Prior Publication Data

US 2024/0251201 A1 Jul. 25, 2024

Related U.S. Application Data

(63) Continuation of application No. PCT/GB2022/052504, filed on Oct. 4, 2022.

(30) Foreign Application Priority Data

Oct. 14, 2021 (GB) ..................................... 2114682

(51) Int. Cl.
*H04R 25/00* (2006.01)
*H04R 1/10* (2006.01)
(Continued)

(52) U.S. Cl.
CPC ........... *H04R 1/323* (2013.01); *H04R 1/1016* (2013.01); *H04R 25/02* (2013.01); *H04R 31/00* (2013.01); *H04R 2225/025* (2013.01)

(58) Field of Classification Search
CPC .. H04R 1/1016; H04R 1/1075; H04R 1/2888; H04R 1/30; H04R 1/323; H04R 1/345;
(Continued)

(56) References Cited

U.S. PATENT DOCUMENTS

| | | | |
|---|---|---|---|
| 1,761,666 | A | 6/1930 | Hinternesch |
| 2014/0138179 | A1 | 5/2014 | Burton et al. |

(Continued)

FOREIGN PATENT DOCUMENTS

| | | | | |
|---|---|---|---|---|
| GB | 2593205 A | 9/2021 | | |
| GB | 2635215 A * | 5/2025 | ............. | G10K 11/22 |

(Continued)

OTHER PUBLICATIONS

PCT International Search Report for PCT International Application PCT/GB2022/052504, filed on Oct. 4, 2022, mailed on Mar. 2, 2023.

(Continued)

*Primary Examiner* — Phylesha Dabney
(74) *Attorney, Agent, or Firm* — Basil M. Angelo; ANGELO IP

(57) ABSTRACT

An ear insert that has a core with an inner wall defining a longitudinal channel for guiding sound waves, in use, from its first open end to its second open end. The inner wall defining the channel has a first acoustic wave reflecting region 28*a* positioned relative to the first open end so as to reflect, in use, acoustic sound waves through up to 90° onto a second acoustic wave reflecting region 28*b* that is configured to reflect, in use, acoustic sound waves back through an angle of up to 90° toward the second open end.

19 Claims, 9 Drawing Sheets

(51) Int. Cl.
*H04R 1/32* (2006.01)
*H04R 25/02* (2006.01)
*H04R 31/00* (2006.01)

(58) Field of Classification Search
CPC .. H04R 2225/025; H04R 25/02; H04R 31/00; H04R 1/10; H04R 1/1091; H04R 2201/10
USPC .......................................................... 381/328
See application file for complete search history.

(56) References Cited

U.S. PATENT DOCUMENTS

| | | | | |
|---|---|---|---|---|
| 2014/0193022 | A1 | 7/2014 | Koizumi | |
| 2019/0182576 | A1* | 6/2019 | Pierce .................. | H04R 1/1016 |
| 2019/0253783 | A1 | 8/2019 | O'callaghan et al. | |

FOREIGN PATENT DOCUMENTS

| | | | | |
|---|---|---|---|---|
| GB | 2635220 | A * | 5/2025 | ........... H04R 1/1016 |
| WO | 2020208342 | A1 | 10/2020 | |
| WO | 2021019026 | A2 | 2/2021 | |

OTHER PUBLICATIONS

PCT Written Opinion on Patentability for PCT International Application PCT/GB2022/052504, filed on Oct. 4, 2022, mailed on Mar. 2, 2023.

UK Intellectual Property Office Search Report under Section 17 for United Kingdom patent application GB2114682.4, filed on Oct. 14, 2021, mailed on Jan. 6, 2022.

* cited by examiner

EAR INSERT

CROSS-REFERENCE TO RELATED APPLICATIONS

This application is a continuation of PCT International Application PCT/GB2022/052504, filed on Oct. 4, 2022, which claims the benefit of, or priority to, United Kingdom Patent Application 2114682.4, filed on Oct. 14, 2021, all of which are hereby incorporated by reference in their entirety for all purposes.

FIELD OF THE INVENTION

This invention relates generally to an ear insert such as an earphone intended for placement in a user's ear so that they can hear sound from an audio source, or an ear waveguide device for reducing sound distortion caused by resonance within the ear canal.

BACKGROUND OF THE INVENTION

Earphones and headphones are well known and in widespread use for enabling users to hear audio signals such as music or speech. Whilst the terms are often used interchangeably, headphones tend to comprise a pair of speakers joined by a band worn over a user's head so that the speakers fit over the user's ears, whereas earphones or, more precisely, in-ear earphones are designed to fit inside the ear canal with the intention of keeping sound in and extraneous background noise out.

In general, an in-ear earphone comprises a generally tubular housing of some type, with an acoustic driver unit at one end and an ear bud at the other for securing the earphone within the entrance of the user's ear canal. An acoustic driver unit is a small magnetic disk present in tubular housing that is connected with small wiring and is responsible for generating sound. An acoustic driver unit consists of three major components, namely:

i) Magnet: for creating a magnetic field for the diaphragm;
ii) Diaphragm: vibrates in the magnetic field that creates audio waves; and
iii) Voice Coils: convert electrical signals into audio.

It is well understood in the field of in-ear earphone design that there is a trade off between sound quality and the acoustic driver type (and, therefore, cost). Lower-cost earphones tend to include a dynamic driver or balanced armature drivers, which are the most common and low cost driver units in widespread use today. Dynamic drivers can be advantageous in that they can drive powerful bass at low power output, and balanced armature drivers are of a very small size, which means that several of them can be included in a single earphone housing. Nevertheless, both types of driver have associated therewith a significant challenge when it comes to achieving sufficient noise cancellation to produce the balanced bass, stereo and loudness needed to give a crisp, high quality sound output. All such acoustic driver units are highly susceptible to decayed enclosure reflections that degrade the sound quality.

This issue is often attempted to be mitigated by making the tubular housing separating the acoustic driver unit from the user's ear drum as small/short as possible. However, this, in turn, highlights another problem associated with in-ear earphones, namely comfort, fit and retention within the user's ear. Resiliently deformable ear buds of varying sizes may be provided with the earphones so that a user can choose a size most suitable for them. The selected ear bud is mounted over the end of the housing (furthest from the acoustic driver unit) before the earphone is inserted into the user's ear canal. The ear bud deforms and then, in theory, moulds itself to the entrance to the user's ear canal so that it is, not only retained in place, but also positioned to direct sound from the acoustic driver unit to the user's ear drum. However, this is by no means a perfect solution and even with the best ear bud of the selection for any particular user, problems arise such as discomfort and unintentional dislodging of the earphone from the user's ear. Furthermore, current designs aim to place the acoustic driver unit as close to the user's ear drum, in use, as possible using a tubular core. This is because the tubular core causes decayed enclosure reflections which degrade the sound quality, so this is attempted to be mitigated by making the tubular enclosure as short as possible. This means that the acoustic driver unit is generally located in the housing such that it is within the entrance to the user's ear canal, in use. This, in turn, means that the driver has to be small enough to fit inside the ear canal entrance of a wide variety of users having different ear sizes and, even then, the space between the ear bud and the user's ear drum varies greatly, as, therefore, does the sound quality achievable.

Other designs have used ridged driver materials such as beryllium and aluminium, which serves to improve the sound quality to a limited extent, and then also at a significant additional cost. Even earphones that don't use a generally tubular core, experience the same inherent problems.

It is an object of aspects of the invention to address at least one or more of these issues.

SUMMARY OF THE INVENTION

In accordance with a first aspect of the invention, there is provided an ear insert comprising a core having an inner wall defining a longitudinal channel for guiding sound waves, in use, from a first open end thereof to a second open end, the inner wall defining the channel having a first acoustic wave reflecting region positioned relative to the first open end so as to reflect, in use, acoustic sound waves through up to 90° onto a second acoustic wave reflecting region that is configured to reflect, in use, acoustic sound waves back through an angle of up to 90° toward said second open end.

Beneficially, the ear insert may comprise a first sound guiding region for guiding sound waves from said first open end into said channel, wherein said first acoustic wave reflecting region comprises a first substantially planar surface that extends from said first sound guiding region generally longitudinally along the inner wall defining said channel at an angle of up to 135o relative to the longitudinal axis of said first sound guiding region. For the avoidance of doubt, the first substantially planar surface is beneficially configured, when oriented for use, to reflect sound waves entering the first sound guiding region along a longitudinal axis (into the user's ear canal) laterally (in the direction toward the tip of the user's nose). Alternatively, or in addition, the ear insert may comprise a second sound guiding region for guiding sound waves out of said channel through said second open end, wherein said second acoustic wave reflecting region comprises a substantially planar surface that extends generally longitudinally along the inner wall defining said channel, diametrically opposite to, and longitudinally offset from, said first acoustic wave reflecting region, at an angle of up to 45o relative to the longitudinal axis of said second sound guiding region, thereby beneficially reflecting the sound waves back along the longitudinal axis, toward the user's ear drum.

More generally, in a preferred embodiment, the first and second acoustic wave reflecting regions may be substantially parallel to, and at least partially longitudinally offset from, each other along said channel.

The inner wall defining said channel may beneficially, comprise a generally funnel shaped channel portion between said first and second acoustic wave reflecting regions, the channel portion having a larger diameter nearest the first acoustic wave reflecting region than nearest the second acoustic wave reflecting region, for guiding acoustic sound waves reflected by the first acoustic wave reflecting region onto the second acoustic wave reflecting region. This acts to minimise following wave interference as the sound waves travel through the channel.

The inner wall defining said channel beneficially comprises a sound guiding channel portion between said second acoustic wave reflecting region and said second open end, the sound guiding channel portion defining a longitudinal axis and having a uniformly increasing lateral diameter along its length from said second acoustic wave reflecting region to said second open end. Once again, this 'horn' shaped output channel helps to minimise following wave interference.

The ear insert may optionally, further comprise a resiliently deformably ear bud mounted on the core over the second open end. However, in alternative embodiments, an ear bud may be integrally formed with the outer surface of the core at the second open end.

The ear insert preferably further comprises an end cap, mounted or otherwise provided over said first open end of the core, the end cap having a generally central opening smaller than the first open end of the core. The end cap may comprise a cap portion extending laterally over said first open end of the core, having inner and outer parallel planar surfaces defining a longitudinal depth therebetween, and defining said generally central opening, the diameter of a first opening in at the inner planar surface nearest said first open end of the core being smaller than that of a second concentric opening in the outer planar surface, and wherein a tapered wall extends between the first and second openings to define a generally funnel shaped acoustic waveguide into and/or out of the first open end of the core. This funnel shaped sound inlet/outlet prevents sound reflections back onto an acoustic driver unit (if present) and acts to guide sound into the open end of the core without creating interference or noise (especially beneficial in the case of a passive ear insert).

The angle between the tapered walls that extend between the first and second openings may be 80-100°, more preferably 85-95°, and most preferably, at least in an exemplary embodiment, around 90°.

The end cap may beneficially, further comprises a grille extending across said generally central opening. This acts to protect and hide an acoustic driver unit (if present) and to prevent dust and debris from entering the channel through the core via the first open end. The grille beneficially comprises one or more elongate members extending across said generally central opening, the or each of said elongate members having a generally triangular (or truncated triangular) cross-section with the apex or narrowest end thereof facing into said first open end of the core. Once again, this tapering profile allows sound from the rear of an acoustic driver unit (if present) to exit the core without reflecting back onto the driver and creating interference and helps to guide sound into the channel through the first open end in the case of a passive insert. The angle of said apex may be 80-100o, more preferably 85-95°, and most preferably, in at least one exemplary embodiment, around 90°.

In an exemplary embodiment, the ear insert may comprise a generally cross-shaped grille extending across said first opening between said tapered wall, each leg of said grille having a generally triangular (or truncated triangular) cross-section with the apex (or truncated apex) facing into said first open end of said core.

Beneficially, the diameter of the first open end may be larger than the diameter of the second open end of the core. The length of the core, from the first open end to the second open end may be between 10 and 25 mm, with the outer walls thereof being generally shaped and configured to match the inner profile of a human ear canal. In some embodiments, the smaller end of this length range may be more suitable for earphones intended for children. Thus, the insert fits neatly within the average ear canal, with a portion of the core nearest the first open end sitting just behind the tragus.

An exemplary embodiment of the invention provides an earphone comprising an ear insert substantially as described above with an acoustic driver unit located at or adjacent said first open end of the core. In this case, the channel may comprise a first sound guiding channel portion adjacent said first open end of the core of a diameter sufficient to receive said acoustic driver unit diametrically across said first sound guiding channel portion. The open end of the core may be configured to removably receive an end cap.

Another exemplary embodiment of the invention comprises an in-ear hearing aid device comprising an ear insert substantially as described above with an amplifier unit located at or adjacent said first open end of the core, and an external microphone coupled to said amplifier unit.

In all cases, the core may be customised to precisely match and fit the intended user's ear canal. It is known, particularly in the field of in-ear (ITE) hearing aids, to create an ear mold that precisely fits a user's ear canal, by, for example, filling the ear canal with wax (or similar substance), to create a cast of the user's ear canal, and then using the cast to create a corresponding mold of the ear canal using any suitable material (e.g. silicone or other plastics material). This mold can be used as the core of an insert substantially as described above, with the inner wall thereof defining the first and second acoustic wave reflecting regions substantially as described above. Thus, an aspect of the present invention extends to a method of manufacturing an ear insert device comprising creating a mold of a user's ear canal (using any suitable technique), the mold defining therethrough a longitudinal channel, and inserting or integrating, into the longitudinal channel, an ear insert substantially as described above.

These and other aspects of the invention will be apparent from the following detailed description.

BRIEF DESCRIPTION OF THE DRAWINGS

Embodiments of the present invention will now be described, by way of examples only, and with reference to the accompanying drawings, in which.

DETAILED DESCRIPTION OF THE INVENTION

Figure 1A:
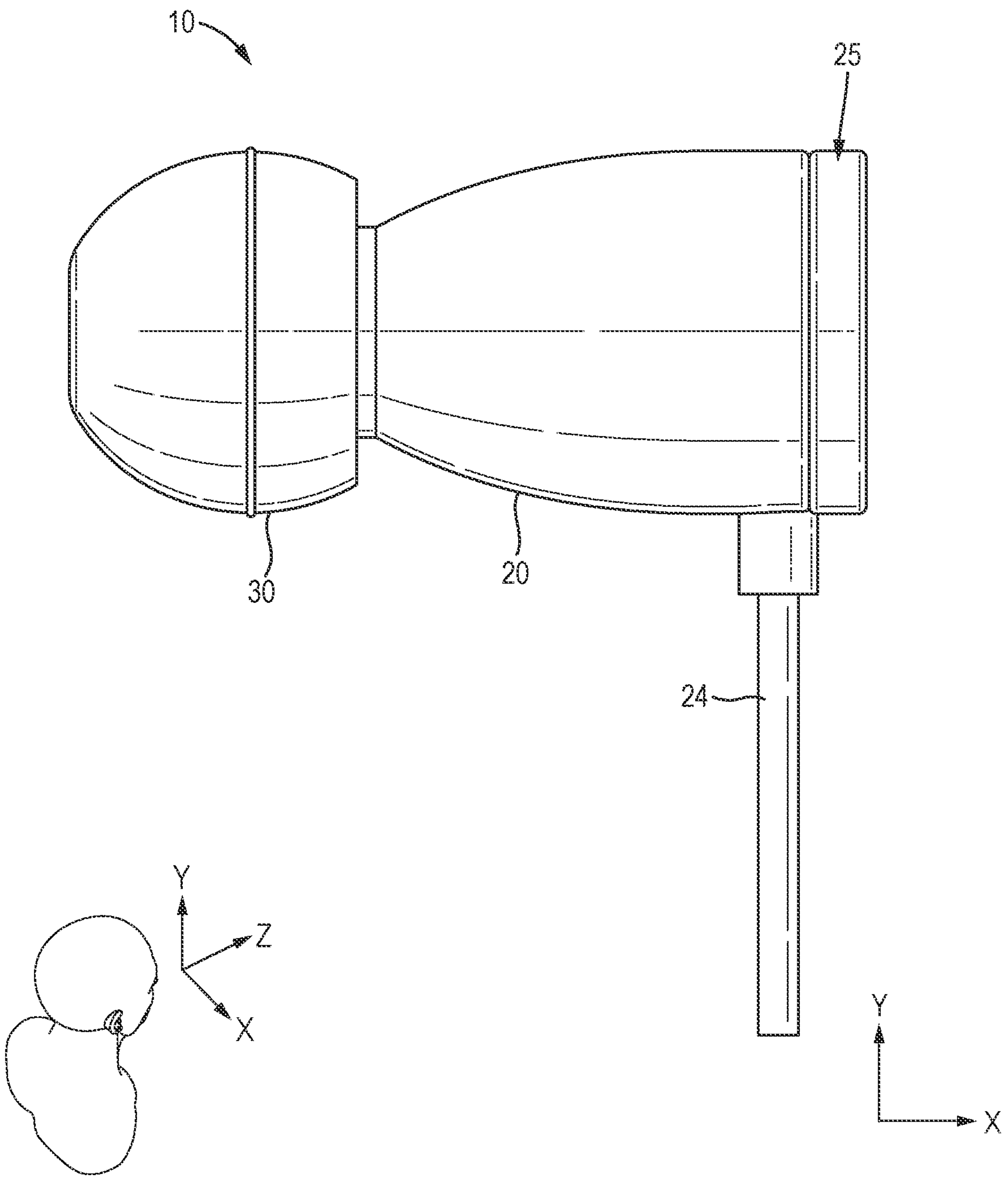
FIG. 1*a* is a schematic side view of an in-ear earphone according to an exemplary embodiment of the invention.
Figure 1B:
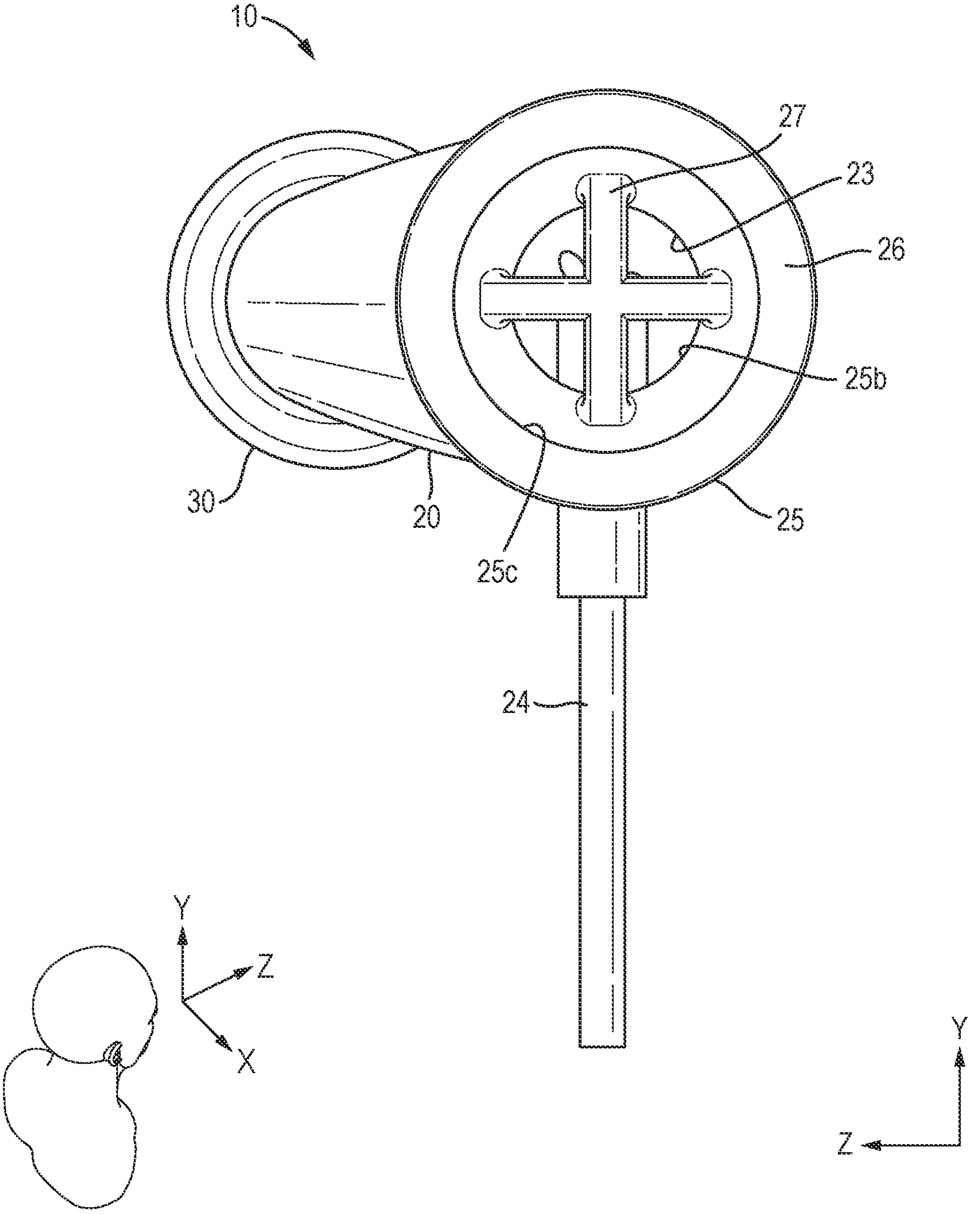
FIG. 1*b* is a schematic rear perspective view of the in-ear earphone of FIG. 1*a;*

Referring to FIGS. 1*a* and 1*b* of the drawings, an in-ear earphone 10 according to an exemplary embodiment of the invention comprises a core 20, and end cap 25 and a resiliently deformable ear bud 30 formed of, for example, silicone or acrylic or, more generally, plastic, metal (e.g. aluminium or titanium), wood, etc. An acoustic driver unit 23 (FIG. 1*b*) is secured at or adjacent a first open end of the core 20 (nearest the end cap 25). The internal details of the acoustic driver are not shown, but it may comprise a universal dynamic driver or one or more balanced armature drivers, for example, which generate sound waves at the end cap end of the earphone 10 so that these sound waves are transmitted through the core 20. Signals may be provided to the acoustic driver unit by wires 24 or by a wireless communication protocol such as Bluetooth®, for example, although the invention is not necessarily intended to be limited in this regard. The specific acoustic driver unit type is not considered pertinent to the present invention, and many different types and sizes of such units will be well known to a person skilled in the art. What is important, however, is that a low-cost acoustic driver unit such as a 10 mm universal dynamic driver may for example, be used whilst still consistently ensuring a near-perfect sound quality, in use.

Figure 2A:
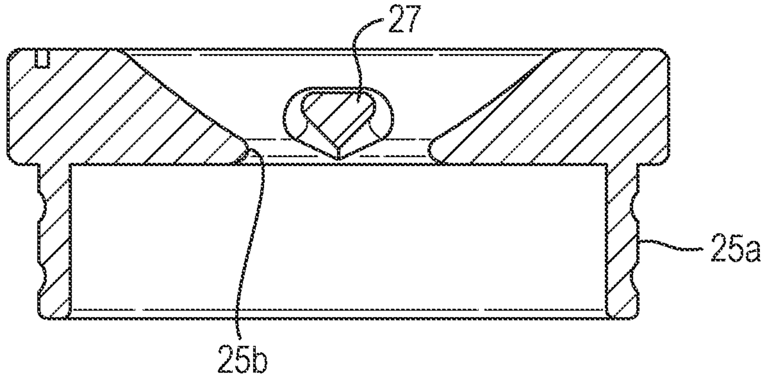
FIG. 2*a* is a schematic cross-sectional side view of an end cap of an in-ear earphone according to an exemplary embodiment of the invention.
Figure 2B:
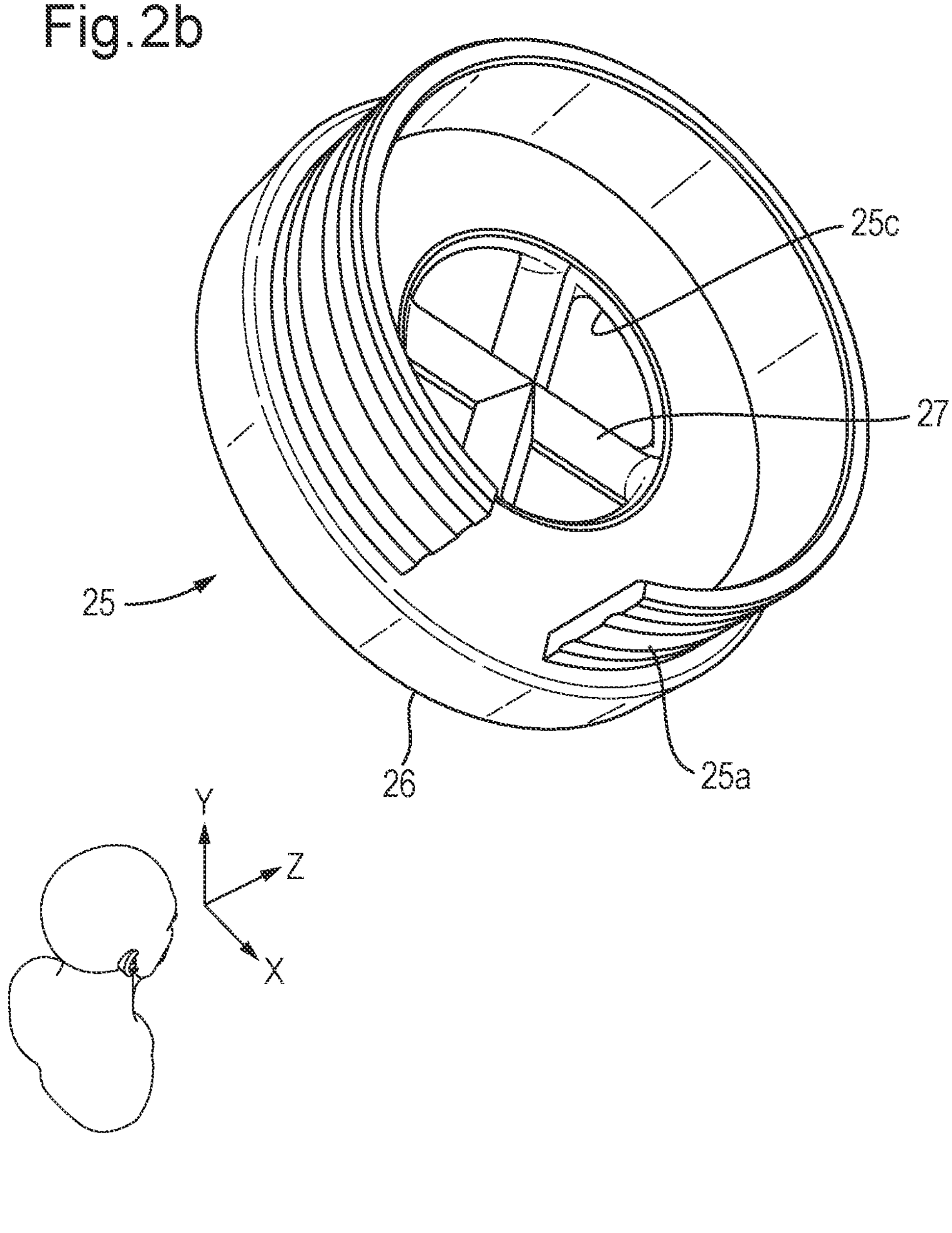
FIG. 2*b* is a schematic rear perspective view of the end cap of FIG. 2*a;*
Figure 2C:
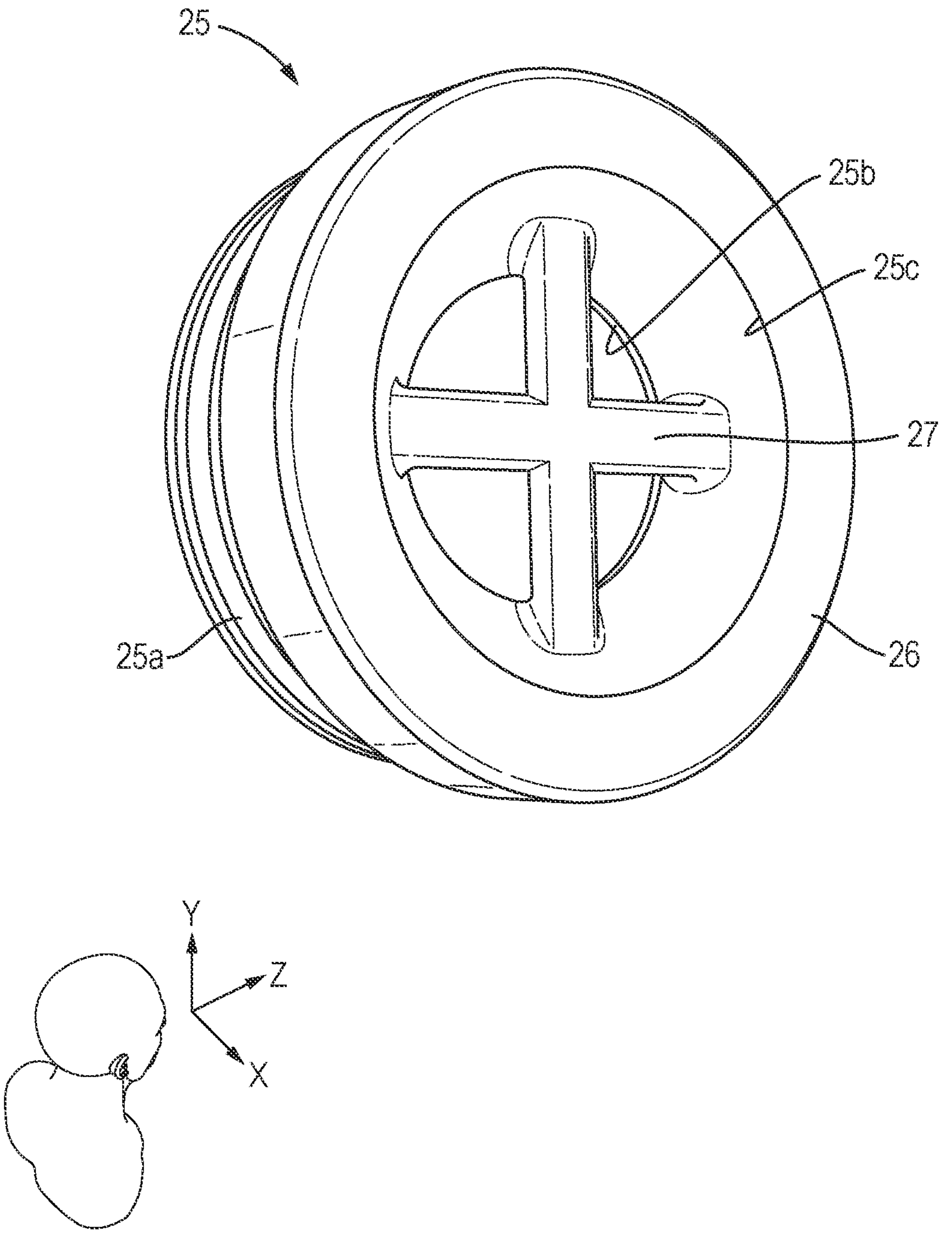
FIG. 2*c* is a schematic front perspective view of the end cap of FIG. 2*a;*

Referring specifically to FIG. 1*b* of the drawings, the end cap 25 may be integrally formed with the core, or it may be a separate piece that is welded, glued or otherwise permanently secured onto the open end of the core 20. However, it is also possible that the end cap 25 could be screwed or push fitted into the open end of the core 20 so that it can be removed (e.g. to replace the driver unit 23) if required. Referring additionally to FIGS. 2*a*, 2*b* and 2*c* of the drawings then, the end cap 25 is provided to protect and, at least to some extent, hide the acoustic driver unit 23. This is necessary, not just for aesthetic reasons, but also to protect the rear face of the driver unit 23, where the cables 24 are soldered. The end cap 25 comprises a cylindrical end portion 25*a* and a thicker cap portion 26 at one end of the cylindrical end portion 25*a*. The opposite end of the cylindrical end portion 25*a* is open and dimensioned to fit inside or over an open end of the core 20 (at the opposite end to the ear buds 30). In the example illustrated, the outer surface of the cylindrical end portion 25*a* is screw threaded so that it can be screwed into the open end of the core 20 (having an inner surface with a cooperative screw threaded portion). The thicker cap portion 26 has a first concentric opening 25*c* at the surface furthest from the cylindrical end portion 25*a* and the surface profile tapers to a smaller second concentric opening 25*b* nearest the cylindrical end portion 25*a* (and the acoustic driver unit 23). This tapering of the cross section between the two concentric openings 25*b*, 25*c* creates a 'horn' shaped opening between the acoustic driver unit 23 and the outside world, in use. If, as in many in-ear earphones, the cap were closed, off completely, sound would be reflected from its inner surface at substantially 180° back to the driver, creating unacceptable distortion and a significant reduction in sound quality. Therefore, having an opening is advantageous. In this case, the inventors have deduced that the 'horn' shaped profile between the first and second openings 25*c*, 25*b* in the cap portion 26 substantially eliminates such sound reflections and encourages sound dispersion. Furthermore, a cross-shaped grille 27 (in this case, but not necessarily, formed integrally with the cap portion 26) extends across the openings 25*c*, 25*b*, between the tapered walls between them, to further protect the acoustic driver unit 23. In order to mitigate reflection of sound back to the acoustic driver unit 23 from the grille 27, the profile of the legs forming the grille 27 is also tapered, from a point (or truncated or rounded apex) nearest the acoustic driver unit 23, outwardly, thus essentially following the tapered profile of the walls of the cap portion 26 between the first and second concentric openings 25*c*, 25*b* (which may be around 90°). The angle formed by the tapered legs of the grille may also be around 90°. These tapered profiles, together, minimise (or even substantially eliminate) reflection of sound waves back to the acoustic driver unit 23, which would otherwise cause distortion and a reduction in sound quality.

Figure 3A:
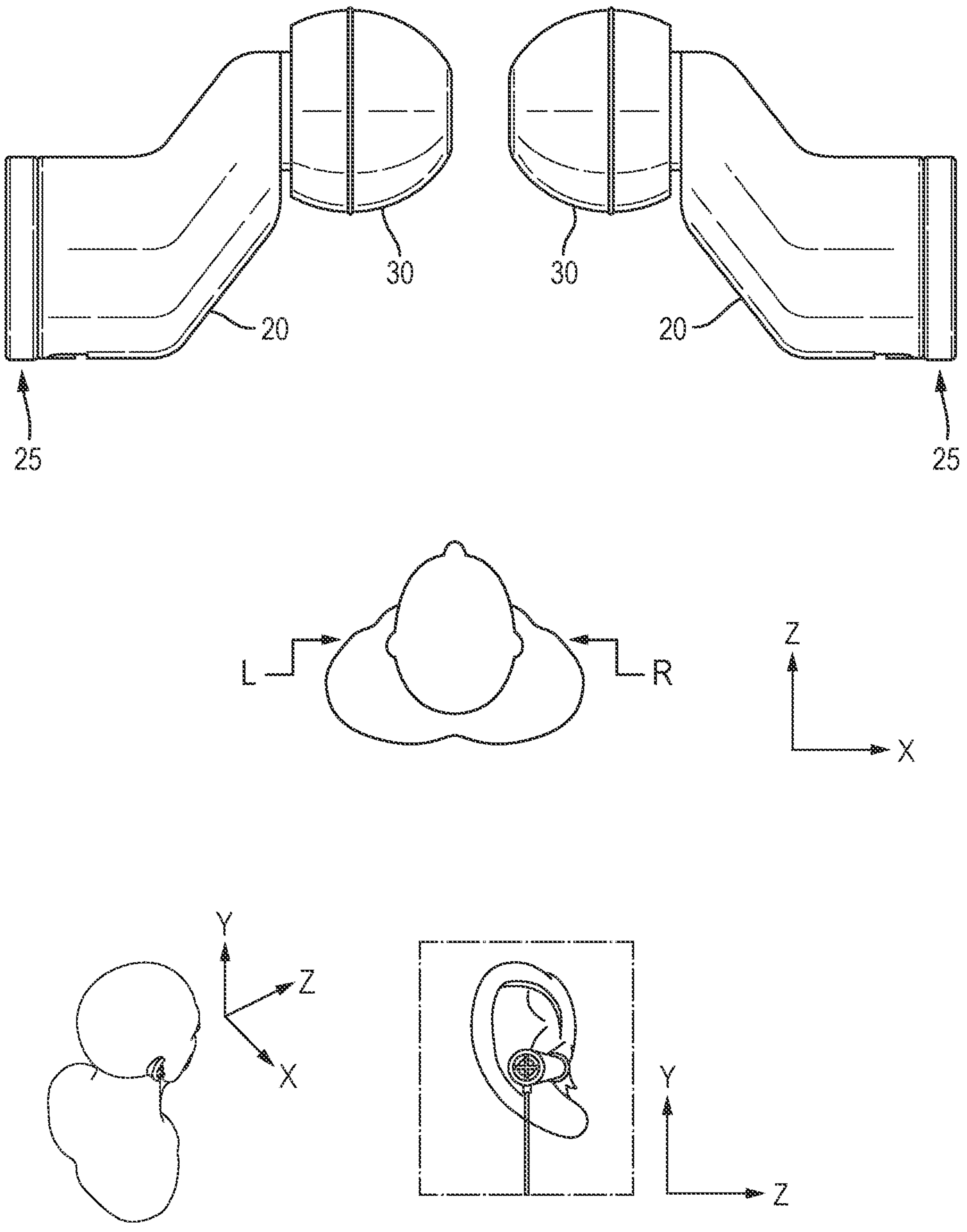
FIG. 3*a* is a schematic top view of a core of an in-ear earphone according to an exemplary embodiment of the present invention.
Figure 3B:
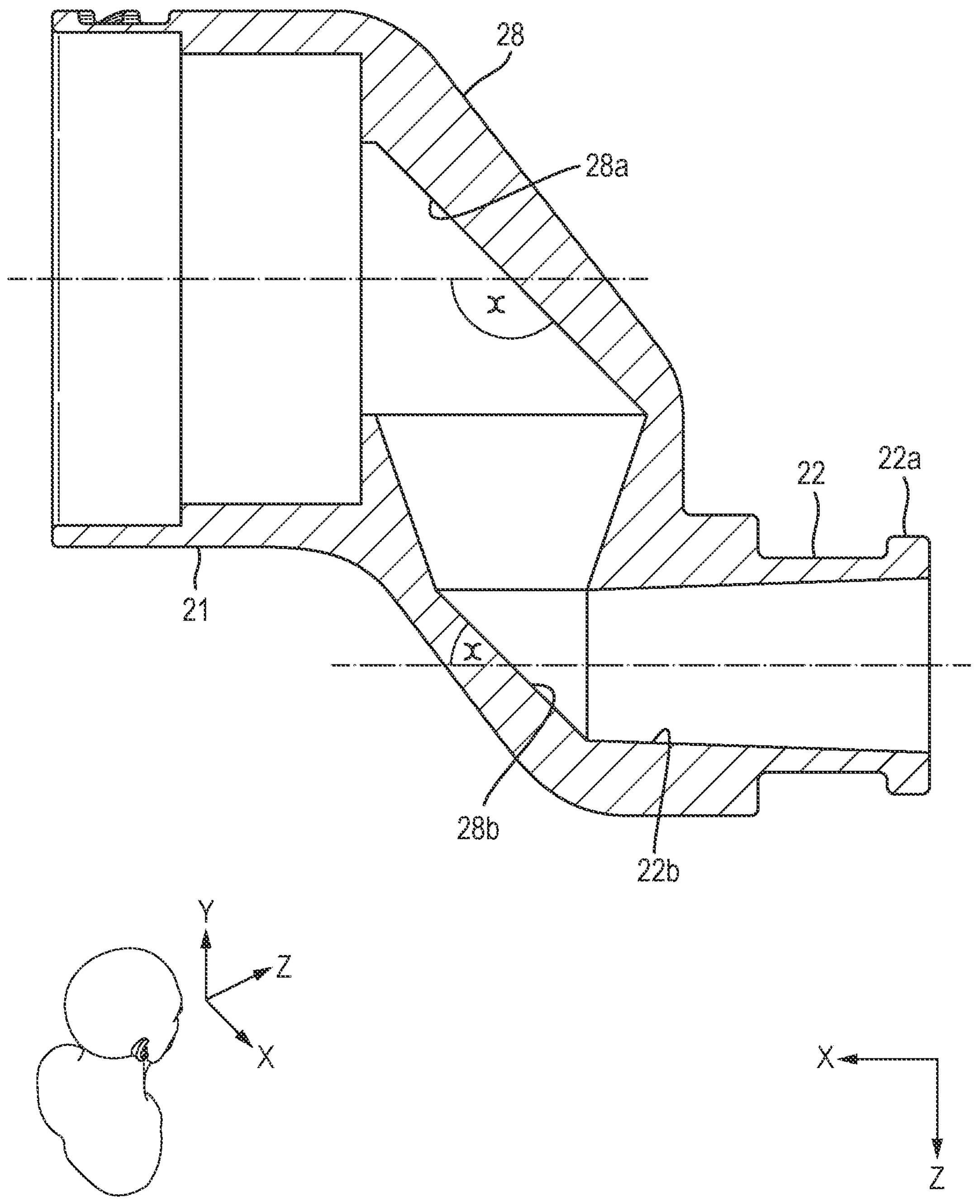
FIG. 3*b* is a schematic cross-sectional top view of the core of FIG. 3*a*.
Figure 3C:
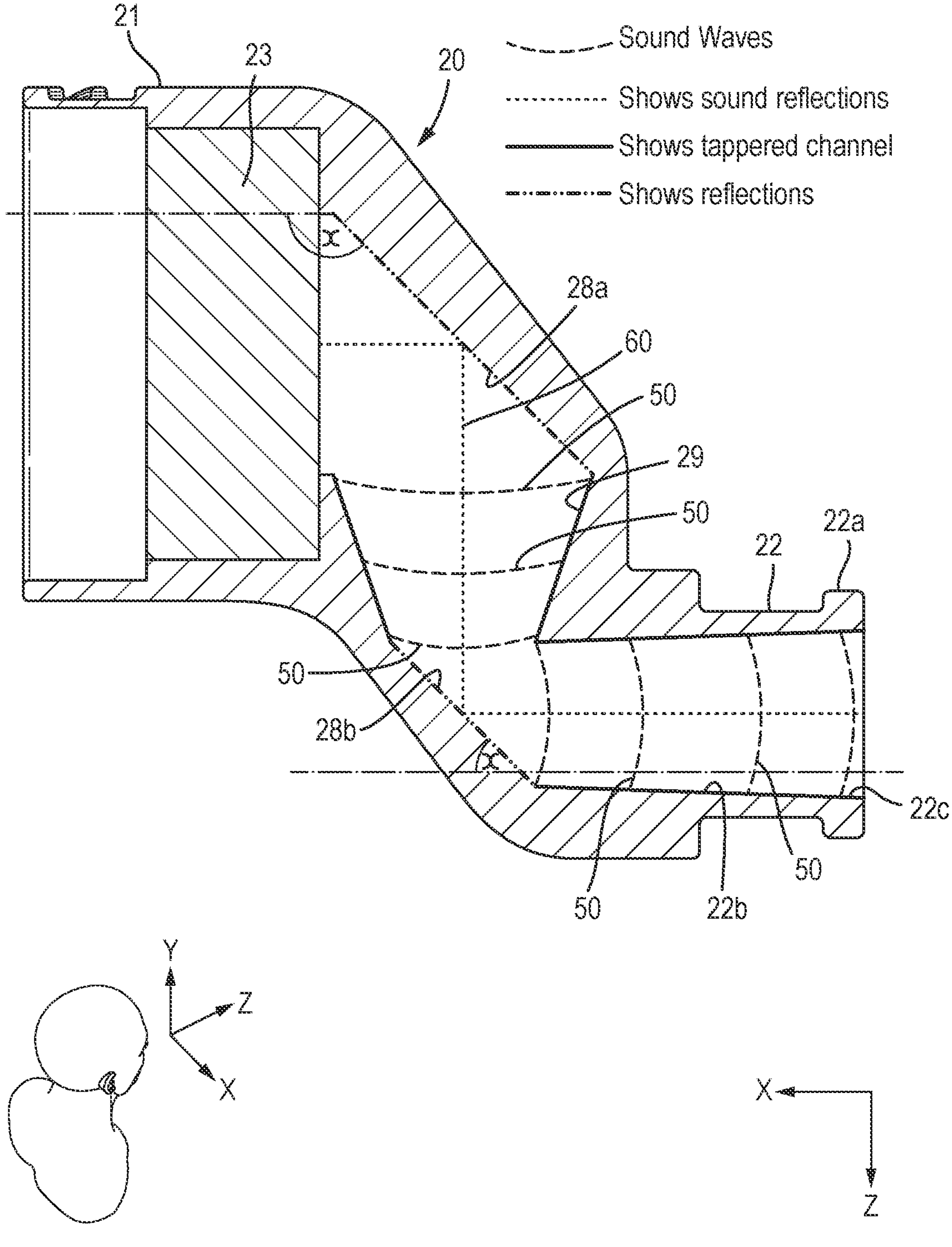
FIG. 3*c* is a schematic cross-sectional top view of an in-ear earphone according to an exemplary embodiment of the present invention.

Referring now to FIGS. 3*a*, 3*b* and 3*c* of the drawings, the core 20 of the in-ear earphone 10 defines a sound directing channel from the acoustic driver unit 23 to the opposite end of the core 20 (over which the resiliently deformable ear buds 30 are mounted). Referring specifically to FIGS. 3*b* and 3*c* of the drawings, the core 20 comprises a first, generally tubular section 21, within which the end cap 25 and the acoustic driver unit 23 are located. This part of the core 20 is furthest from the ear buds 30 and, therefore, the user's ear drum, in use. The core 20 further comprises a second generally tubular section 22 at the opposite end, over which the ear buds 30 are mounted and which, therefore, sits closest to the user's ear drum, in use. The second tubular end 22 is open ended and defines an outer ridge 22*a* over which the ear bud 30 is mounted and held in place. The first tubular section 21 is substantially cylindrical with a circular cross-section and of diameter to accommodate the selected acoustic driver unit(s) 23. For example, if a universal 10 mm dynamic driver unit is used, the inner diameter of the first tubular section 21 may be just slightly larger than that (e.g. 10.5 mm or so). It will be apparent, however, that any one of a number of different acoustic driver units may be used, with similarly superior results, without departing from the scope of the invention as defined in the appended claims. In use, the first tubular section 21 can sit outside the user's ear canal, just behind the tragus, although it could protrude a little beyond the tragus in some embodiments. Therefore, the invention is not limited to acoustic driver units that are small enough to fit inside the user's ear canal. The inner diameter of the first tubular section 21 is greater at its open end (to receive the cylindrical end portion 25*a* of the end cap 25) with a stepped decrease in diameter marking where the cylindrical end portion of the end cap stops when the end cap is fully located in the core 20. The remaining portion of the first tubular end portion 21 defines a cavity for directing sound from the acoustic driver unit 23 into the rest of the core 20.

The inner channel 22*b* running through the second tubular section 22 is slightly flared, outwardly towards its open end, giving it a slightly 'horn' shaped profile, having a substantially circular cross-section all the way along its length of uniformly increasing diameter toward its open end.

The first and second tubular end sections 21, 22 are connected together by an integral tapered channel portion 28. The inner profile of the tapered channel portion 28 is configured to direct sound waves entering the core 20 from the acoustic driver unit 23 from the end of the first tubular section 21 to the open end of the second tubular section 22, whilst the outer profile of the core 20, including the tapered channel portion 28, is configured to match the shape of a user's ear canal such that the open end of the second tubular section 22, including the ear bud 30, sits adjacent the user's ear drum, and the first tubular section 21 (incorporating the acoustic driver unit 23) sits just behind the tragus, just outside the entrance to the ear canal. The inner profile of the channel portion 28 comprises a first planar wall 28*a* that extends from the inner end of the first tubular section 21, close to the top when the earphone is correctly oriented for use. The planar wall is angled laterally (relative to a nominal longitudinal (horizontal) plane) at an obtuse angle $\alpha$ (e.g. ~135°), as illustrated schematically in FIG. 3*c* of the drawings. The inner profile of the channel portion 28 further comprises a second planar wall 28*b* on a 'lower' portion of the channel portion 28 (when the device is oriented for use). The two planar walls 28*a* and 28*b* are substantially parallel to each other but longitudinally offset such that sound waves travelling toward a user's ear drum in a substantially straight line from the acoustic driver unit 23 first hit the first planar wall portion 28*a* and are reflected laterally (toward the tip of the user's nose, in use) in the channel portion, at substantially 90°, so that they hit the second planar wall portion 28*b*. The sound waves are then reflected through substantially 90° again (in the opposite direction, back toward the user's ear drum) so that they exit the channel portion 28 in a substantially straight line through the second tubular section 22. The slightly flared profile inside the second tubular section 22 serves to further mitigate any sound distortion.

A tapered channel section 29 extends between the end of the first planar wall 28*a* and the nearest end of the second planar wall 28*b*. The tapered channel section has a 'frustoconical' profile, with a substantially circular cross-section of uniformly decreasing diameter in the direction from the end of the first planar wall 28*a* to the nearest end of the second planar wall 28*b*.

In use, the ear bud 30 of an earphone 10 is pushed into the user's ear, such that the open end of the second tubular section 22 is near the user's ear drum. The outer profile of the core is such that it fits comfortably within the user's ear canal with the driver portion of the first tubular section sitting just outside the entrance to the ear canal, immediately behind the tragus. Sound waves emitted from the acoustic driver unit 23 travel in a straight line along the channel defined through the first tubular section 21 until they hit the first planar wall 28*a*. The sound is reflected by the first planar wall 28*a*, through substantially 90°, toward the tapered channel section 29. The tapered channel section serves to guide the sound waves 50 directly onto the second planar wall 28*b*. The sound is reflected by the second planar wall 28*b*, back through substantially 90°, into the flared channel 22*b* defined through the second tubular section 22, and out through the opening 22*c* at the end onto the user's ear drum. The path 60 of the sound from the acoustic driver unit 23 to the opening 22*c* at the other end of the core 20 is illustrated schematically in FIG. 3*c*.

As a result of the configuration of the inner channel running through the core 20, comprising the first and second planar walls 28*a*, 28*b*, the 'funnel' like channel 29 between them, and the flared channel 22*b* running through the second tubular section 22, the ear drum receives a substantially 'mirror image' of the sound emitted by the acoustic driver unit 23, with very little or no distortion, noise or loss of quality. The 'wavefront' representing the sound remains almost identical throughout its travel through the core to the original driver movement, and following wave interference is minimised by the funnel-like channel 29 between the planar walls 28*a*, 28*b* and the slightly flared channel 22*b* at the output end of the core 20. This is because the impedance of the channels changes as the wave travels through them. Furthermore, rear radiation from the acoustic driver unit 23 is not reflected back to the driver unit by the end cape, due to the flared opening in the end cap 25 and the tapered grille sitting across it, as described above. The driver can be selected according to practicality and cost, rather than size or type, because the sound quality is undiminished as it travels through the core, and the part of the core containing the acoustic driver unit 23 sits outside the user's ear canal (and, therefore, can be of a larger diameter if required).

The human ear has three distinguishable parts, namely the outer, middle and inner ear. The outer ear consists of the visible portion, called the auricle or pinna which projects from the side of the head. The middle ear is a narrow, air-filled cavity known as the ear canal, leading from the outer ear to the inner ear, the inner end of the ear canal being closed by a tympanic membrane so as to form a boundary between the middle ear and the inner ear. The outer ear is shaped to form an irregular shallow funnel, with a depression known as the concha leading directly to the entrance of the ear canal. The concha is partly covered by two small projections, the tongue-like tragus in front and the antitragus behind.

The function of the outer ear is to collect sound waves and guide them, via the ear canal, to the tympanic membrane. In effect, the outer ear acts to 'funnel' sound waves from the listener's vicinity into the ear canal. The ear canal is essentially a tube that is open at one end (the concha region) and closed at the other end (tympanic membrane). The air inside the ear canal acts as a resonating body. Thus, sound waves enter the ear canal, where they are amplified as they travel through the ear canal until they reach the tympanic membrane and are transmitted to the inner ear. However, the geometry of the outer ear, including the concha, creates an interference, characterised by an incoherent sound wave, is amplified by a gain of up to 20 dB at some frequencies, and presents at the tympanic membrane as noise distortion, which can have a negative and detrimental effect on the quality of sounds reaching the inner ear. It has been documented that noise (i.e. intrusive or unwanted sound that disrupts, distracts or detracts from regular functioning) causes stress and can have a negative effect on health and productivity.

Noise can trigger the human fight-or-flight response and cause stress, and the inventor has discovered that noise distortion created by the geometry of the concha and amplified (especially at frequencies above ~1.5 kHz) within the ear canal can trigger the fight-or-flight response in at least some people. Given that a human being almost constantly receives sound waves from various sources during their day-today lives, they are regularly receiving distorted sound amplified at a gain of up to 20 dB at the tympanic membrane, and this amplified distorted sound can cause triggering of the fight-or-flight response. It follows, therefore, that the average human being may be regularly and persistently in a state of elevated stress, simply due to noise distortion of the type described above.

Clearly, then, there is a desire to reduce the occurrence of noise distortion created and amplified within the human ear canal, without necessarily reducing the quality or volume of the true sound waves reaching the tympanic membrane.

Figure 4A:
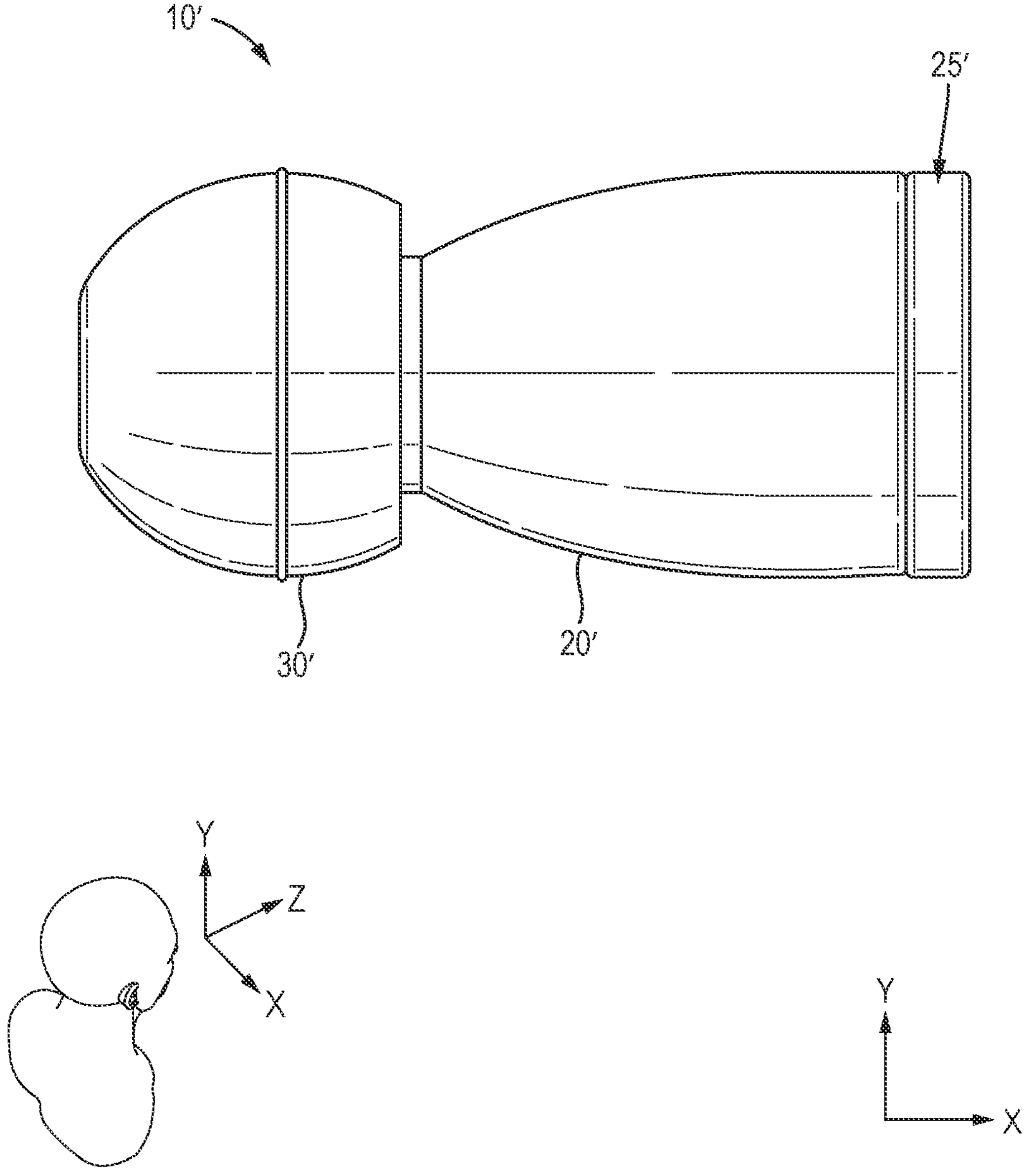
FIG. 4*a* is a schematic side view of an ear plug according to an exemplary embodiment of the present invention.
Figure 4B:
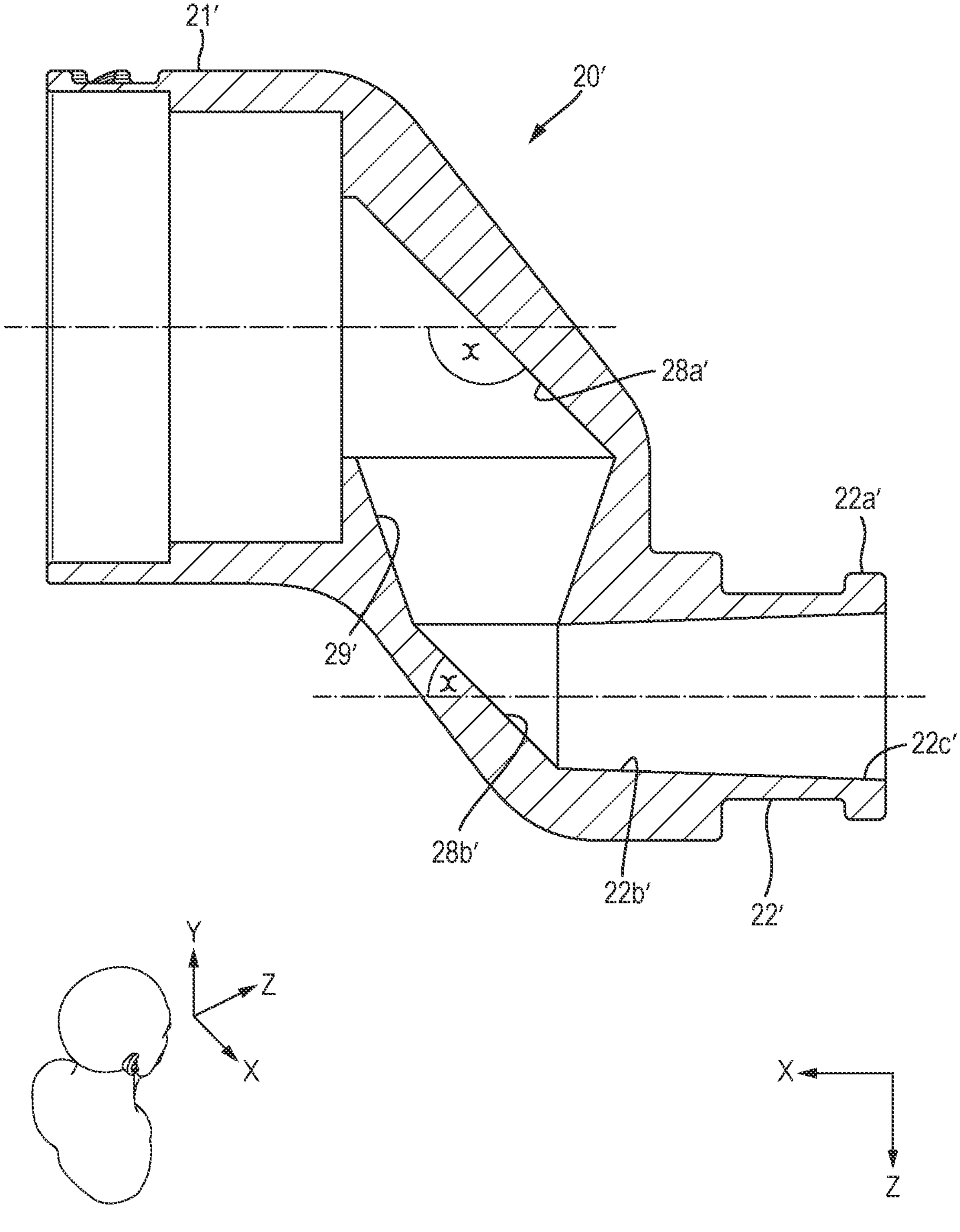
FIG. 4*b* is a schematic top cross-sectional view of the core of the ear plug of FIG. 4*b*.

Accordingly, in another exemplary embodiment of the invention, illustrated schematically in FIGS. 4*a* and 4*b* of the drawings, a passive earplug 10' is provided that is identical in all respects to the earphone described above with reference to FIGS. 1*a* to 3*c*, except that the acoustic driver unit and the associated wiring are omitted. Thus, an earplug according to an exemplary embodiment of the invention comprises a core 20', an end cap 25 at one end of the core 20' and a resiliently deformable ear bud 30' mounted over the open opposite end of the core 20'. The end cap 25' may be of substantially the same shape and configuration as that described above with reference to FIGS. 2*a* to 2*c*, and as such, will not be described again here.

Referring specifically to FIG. 4*b* of the drawings, the core 20' of the ear plug 10' defines a sound directing channel from the opening in the end cap 25' to the opposite end of the core 20' (over which the resiliently deformable ear buds 30' are mounted). The core 20' comprises a first, generally tubular section 21', within which the end cap 25' and the acoustic driver unit 23' are located. This part of the core 20' is furthest from the ear buds 30' and, therefore, the user's ear drum, in use. The core 20' further comprises a second generally tubular section 22' at the opposite end, over which the ear buds 30' are mounted and which, therefore, sits closest to the user's ear drum, in use. The second tubular end 22' is open ended and defines an outer ridge 22*a*' over which the ear bud 30' is mounted and held in place. The first tubular section 21' is substantially cylindrical with a circular cross-section. The inner diameter of the first tubular section 21' is, as before, greater at its open end (to receive the cylindrical end portion of the end cap 25') with a stepped decrease in diameter marking where the cylindrical end portion of the end cap stops when the end cap is fully located in the core 20'. The remaining portion of the first tubular end portion 21' defines a cavity for directing sound from the outside world into the rest of the core 20.

The inner channel 22*b*' running through the second tubular section 22' is slightly flared, outwardly towards its open end, giving it a slightly 'horn' shaped profile, having a substantially circular cross-section all the way along its length of uniformly increasing diameter toward its open end.

The first and second tubular end sections 21', 22' are connected together by an integral tapered channel portion 28'. The inner profile of the tapered channel portion 28' is configured to direct sound waves entering the core 20' from the acoustic driver unit 23' from the end of the first tubular section 21' to the open end of the second tubular section 22', whilst the outer profile of the core 20, including the tapered channel portion 28', is configured to match the shape of a user's ear canal such that the open end of the second tubular section 22', including the ear bud 30', sits adjacent the user's ear drum, and the first tubular section 21' (incorporating the acoustic driver unit 23') sits just behind the tragus or may protrude a little beyond it, outside the ear canal, just outside the entrance to the ear canal. The inner profile of the channel portion 28' comprises a first planar wall 28*a*' that extends from the inner end of the first tubular section 21', close to the top when the earphone is correctly oriented for use. The planar wall is angled laterally (relative to a nominal longitudinal plane) at an obtuse angle $\alpha$ (e.g. ~135°), as illustrated schematically in FIG. 4*b* of the drawings. The inner profile of the channel portion 28' further comprises a second planar wall 28*b*' on a 'lower' portion of the channel portion 28' (when the device is oriented for use). The two planar walls 28*a*' and 28*b*' are substantially parallel to each other but longitudinally offset such that sound waves travelling in a straight line from the opening in the end cap 25', toward the user's ear drum, first hit the first planar wall portion 28*a*' and are reflected laterally (toward the tip of the user's nose, when the deice is oriented for use) in the channel portion, at substantially 90°, so that they hit the second planar wall portion 28*b*'. The sound waves are then reflected through substantially 90° again (in the opposite direction, back toward the user's ear drum) so that they exit the channel portion 28' in a substantially straight line through the second tubular section 22'. The slightly flared profile inside the second tubular section 22' serves to further mitigate any sound distortion.

A tapered channel section 29' extends between the end of the first planar wall 28*a*' and the nearest end of the second planar wall 28*b*'. The tapered channel section has a 'frusto-conical' profile, with a substantially circular cross-section of uniformly decreasing diameter in the direction from the end of the first planar wall 28*a*' to the nearest end of the second planar wall 28*b*'.

The earplug can be used on its own, to reduce noise distortion encountered during a user's day to day life, and/or it can be used with conventional ear phones or headphones to significantly improve the quality of sound a user hears, or it could be used within a virtual reality (VR) or augmented reality (AR) system to improve the realism of sound quality and directionality, thereby significantly improving user experience and engagement.

It will be apparent to a person skilled in the art, from the foregoing description, that modifications and variations can be made to the described embodiments without departing from the scope of the invention as defined by the appended claims.

What is claimed is:

1. An ear insert comprising a core having an inner wall defining a longitudinal channel for guiding sound waves, in use, from a first open end thereof to a second open end, the inner wall defining the channel having a first acoustic wave reflecting region and a second acoustic wave reflecting region, the first acoustic wave reflecting region being positioned relative to the first open end so as to reflect, in use, acoustic sound waves through up to 90° onto said second acoustic wave reflecting region, said second acoustic wave reflecting region being configured to reflect, in use, acoustic sound waves back through an angle of up to 90° toward said second open end, wherein said first and second acoustic wave reflecting regions comprise planar surfaces and are substantially parallel to, and at least partially longitudinally offset from, each other along said channel.

2. An ear insert according to claim 1, comprising a first sound guiding region for guiding sound waves from said first open end into said channel, wherein said first acoustic wave reflecting region comprises a substantially planar surface that extends from said first sound guiding region generally longitudinally along the inner wall defining said channel at a lateral angle of up to 135° relative to the longitudinal plane defined by said first sound guiding region.

3. An ear insert according to claim 1, comprising a second sound guiding region for guiding sound waves out of said channel through said second open end, wherein said second acoustic wave reflecting region comprises a substantially planar surface that extends generally longitudinally along the inner wall defining said channel, diametrically opposite to, and longitudinally offset from, said first acoustic wave reflecting region, at a lateral angle of up to 45° relative to the longitudinal plane defined by said second sound guiding region.

4. An ear insert according to claim 1, wherein the inner wall defining said channel comprises a generally funnel shaped channel portion between said first and second acoustic wave reflecting regions, the channel portion having a larger diameter nearest the first acoustic wave reflecting region than nearest the second acoustic wave reflecting region, for guiding acoustic sound waves reflected by the first acoustic wave reflecting region onto the second acoustic wave reflecting region.

5. An ear insert according to claim 1, wherein the inner wall defining said channel comprises a sound guiding channel portion between said second acoustic wave reflecting region and said second open end, the sound guiding channel portion defining a longitudinal axis and having a uniformly increasing lateral diameter along its length from said second acoustic wave reflecting region to said second open end.

6. An ear insert according to claim 1, further comprising a resiliently deformably ear bud mounted on the core over the second open end.

7. An ear insert according to claim 1, further comprising an end cap, mounted or otherwise provided over said first open end of the core, the end cap having a generally central opening smaller than the first open end of the core.

8. An ear insert according to claim 7, wherein the end cap comprises a cap portion extending laterally over said first open end of the core, having inner and outer parallel planar surfaces defining a longitudinal depth therebetween, and defining said generally central opening, the diameter of a first opening in at the inner planar surface nearest said first open end of the core being smaller than that of a second concentric opening in the outer planar surface, and wherein a tapered wall extends between the first and second openings to define a generally funnel shaped acoustic waveguide into and/or out of the first open end of the core.

9. An ear insert according to claim 8, wherein the angle between the tapered walls that extend between the first and second openings is 80-100°.

10. An ear insert according to claim 7, wherein the end cap further comprises a grille extending across said generally central opening.

11. An ear insert according to claim 10, wherein said grille comprises one or more elongate members extending across said generally central opening, the or each of said elongate members having a generally triangular (or truncated triangular) cross-section with the apex or narrowest end thereof facing into said first open end of the core.

12. An ear insert according to claim 11, wherein the angle of said apex is 80-100°.

13. An ear insert according to claim 10, comprising a generally cross-shaped grille extending across said first opening between said tapered wall, each leg of said grille having a generally triangular (or truncated triangular) cross-section with the apex (or truncated apex) facing into said first open end of said core.

14. An ear insert according to claim 1, wherein the diameter of the first open end is larger than the diameter of the second open end of the core.

15. An earphone comprising an ear insert according to claim 1 with an acoustic driver unit located at or adjacent said first open end of the core.

16. An earphone according to claim 15, wherein said channel comprises a first sound guiding channel portion adjacent said first open end of the core of a diameter sufficient to receive said acoustic driver unit diametrically across said first sound guiding channel portion.

17. An earphone according to claim 16, wherein said open end of the core is configured to removably receive an end cap.

18. An in-ear hearing aid device comprising an ear insert according to claim 1 with an amplifier unit located at or adjacent the first open end of the core and an external microphone coupled to said amplifier unit.

19. A method of manufacturing an ear insert according to claim 1 for an ear plug, earphone or in-ear hearing aid device, the method comprising creating a core having an outer wall profile corresponding substantially exactly to the profile of a specific user's ear canal, and inserting or integrating in the inner walls thereof the said first and second acoustic wave reflecting regions.

* * * * *